United States Patent [19]

Kajino et al.

[11] Patent Number: 5,521,700
[45] Date of Patent: May 28, 1996

[54] METER FOR TESTING PROGRESSIVE MULTIFOCUS LENSES

[75] Inventors: Tadashi Kajino, Okazaki; Mikio Kurachi, Hazu-gun; Noritsugu Nozawa, Toyokawa; Masanao Fujieda, Toyohashi, all of Japan

[73] Assignee: Nidek Co., Ltd., Japan

[21] Appl. No.: 341,897

[22] Filed: Nov. 15, 1994

Related U.S. Application Data

[63] Continuation of Ser. No. 40,023, Mar. 30, 1993, abandoned.

[30] Foreign Application Priority Data

Mar. 31, 1992 [JP] Japan ................................. 4-108504

[51] Int. Cl.⁶ .................................................... G01B 9/00
[52] U.S. Cl. ........................... 356/124; 356/127; 356/125
[58] Field of Search .................................... 356/124, 125, 356/126, 127, 153

[56] References Cited

U.S. PATENT DOCUMENTS

| | | | |
|---|---|---|---|
| 4,534,645 | 10/1985 | Nohda | 356/125 |
| 4,730,924 | 3/1988 | Allard et al. | 356/124 |
| 4,779,979 | 10/1988 | Iwane | 356/125 |
| 4,826,315 | 5/1989 | Kohayakawa | 356/125 |
| 5,152,067 | 10/1992 | Kurachi et al. | 33/200 |
| 5,173,739 | 12/1992 | Kurachi et al. | 356/124 |
| 5,198,867 | 3/1993 | Campbell | 356/127 |
| 5,247,341 | 9/1993 | Kurazhi et al. | 356/125 |
| 5,307,141 | 4/1994 | Fujieda | 356/124 |
| 5,349,433 | 9/1994 | Iwane | 356/124 |
| 5,379,111 | 1/1995 | Kajino et al. | 356/124 |

FOREIGN PATENT DOCUMENTS 017335  1/1985  Japan.

OTHER PUBLICATIONS

Nidek LM-870 Auto-Lensmeter Operation Manual.

*Primary Examiner*—Rolf Hille
*Assistant Examiner*—Alexander Oscar Williams
*Attorney, Agent, or Firm*—Finnegan, Henderson, Farabow, Garrett & Dunner

[57] ABSTRACT

The present invention provides a lens meter capable of accurately measuring the optical characteristics of a lens including additive diopter and of providing highly reliable data representing the optical characteristics of the lens. The lens meter projects measuring light through a target mark on a lens, focuses an image of the target mark in a target image on a photo-detecting device, and determines the optical characteristics of the lens on the basis of a locus of the target image detected by the photo-detecting device. The lens meter comprises an additive diopter measuring mode selector switch, a control means for shifting the lens to position measuring points distributed at predetermined intervals on the lens successively on a measuring optical axis and measuring the refractive power of the lens at each measuring point, a position detecting means for detecting the distance of each measuring point from a predetermined reference point, and a display means for displaying the relation between the distance of the measuring point from the reference point and the variation of the spherical refractive power of the lens.

16 Claims, 8 Drawing Sheets

METER FOR TESTING PROGRESSIVE MULTIFOCUS LENSES

This application is a continuation of application Ser. No. 08/040,023 filed Mar. 30, 1993, now abandoned.

BACKGROUND OF THE INVENTION

1. Field of the Invention

The present invention relates to a lens meter for measuring the optical characteristics of a lens including spherical refractive power, cylindrical refractive power, axial angle and prism quantity and, more particularly, to a lens meter for measuring the additive diopter of a lens.

2. Description of the Prior Art

A known lens meter, such as "Auto Lens Meter LM-870" proposed by the applicant of the present patent application, determines the optical characteristics of a lens including spherical refractive power, cylindrical refractive power, axial angle and prism quantity on the basis of results of measurement of the locus of measuring light transmitted through the lens by a photo-detecting device. This known automated lens meter is capable of operating in an additive diopter measuring mode and of measuring the additive diopter of a progressive lens. When measuring the additive diopter of a lens by this known lens meter, the lens meter is set for the additive diopter measuring mode, the far viewing section of the lens is measured, the measured data of the far viewing section is stored in a memory, the lens is shifted to position the near viewing section of the lens at the measuring position, the data of the near viewing section is measured when the operator decides that the near viewing section is positioned at the measuring position, and the difference between the measured data of the far viewing section and that of the near viewing section is calculated to determine the additive diopter.

The respective positions of the far viewing section and the near viewing section in the lens are determined subjectively by the operator and the correctness of the determination is dependent on the perception and experience of the operator. Generally, a lens as manufactured is provided with marks indicating the respective positions of the far viewing section and the near viewing section. Therefore, the respective positions of the far viewing section and near viewing section of the lens as manufactured can be fairly accurately determined for measuring the characteristics of the lens. However, these marks are easily erasable, the marks are erased when the framed lens is wiped for cleaning and concealed marks are difficult to recognize visually. Therefore, the accurate measurement of the lens requires a skillful expert operator. Furthermore, any objective data securing correct measurement is not available.

SUMMARY OF THE INVENTION

The present invention has been made in view of the foregoing problems and it is therefore an object of the present invention to provide a lens meter capable of obtaining highly reliable measured data including additive diopter of a lens.

A lens meter in one aspect of the present invention, which project measuring light on a lens, detects the locus of the measuring light transmitted through the lens by a photo-detecting device and determines the optical characteristics of the lens on the basis of the locus of the measuring light detected by the photo-detecting device, comprises: an additive diopter measuring mode selector switch; a control means for continuously measuring the lens at specified intervals to position measuring points on the lens successively on the optical axis of the measuring light; a position detecting means for detecting the deviation of each measuring point on the lens from a specified reference point; and a display means for displaying for displaying the relation between the deviations determined by the position detecting means and the variation of the spherical refractive power.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

General Construction

Figure 1:
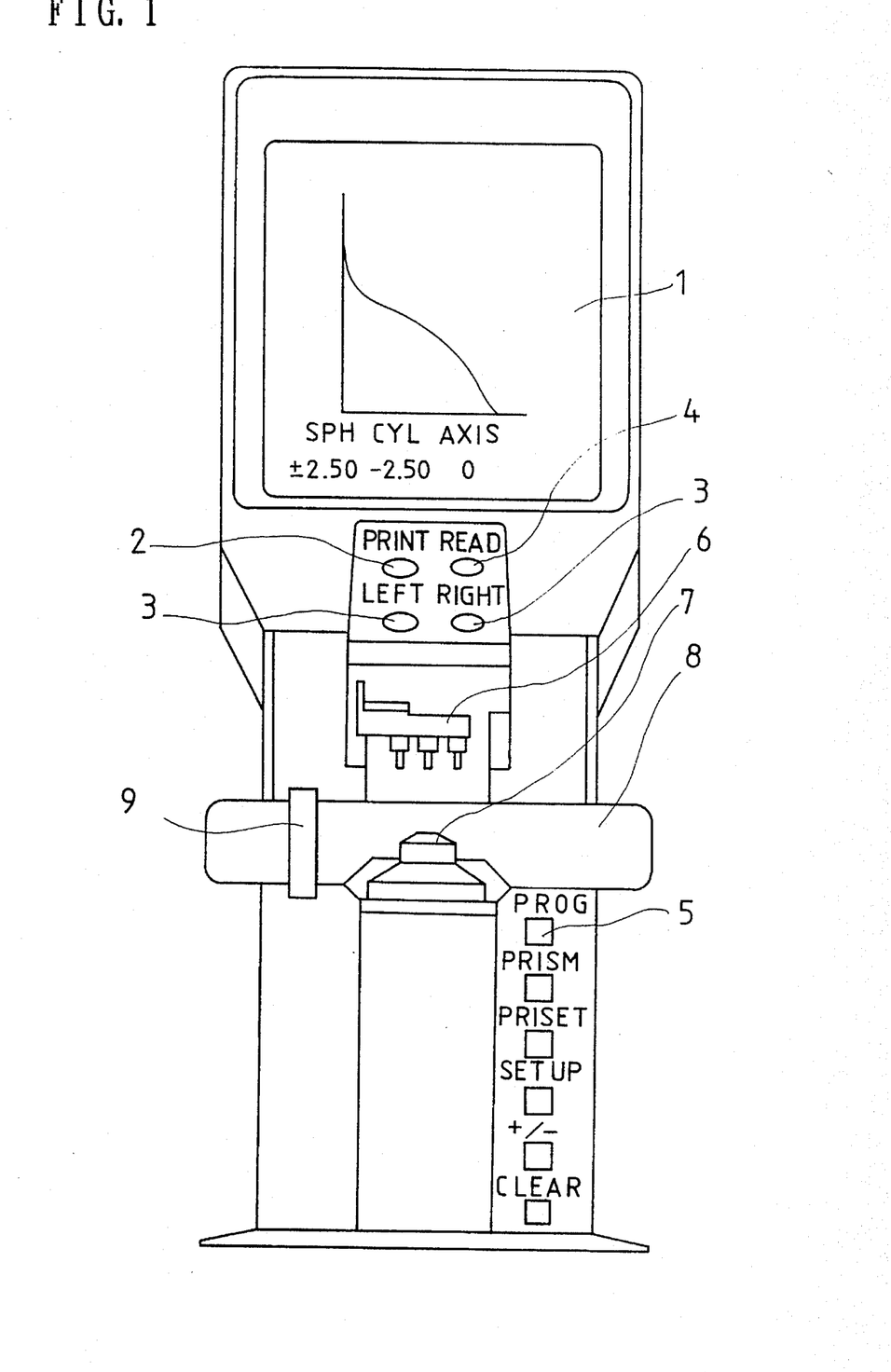
FIG. 1 is a front view of a lens meter in a preferred embodiment according to the present invention.

Referring to FIG. 1 showing a lens meter in a preferred embodiment according to the present invention, a CRT display 1 displays a reticle indicating the optical axis of a measuring optical system, a positioning cross target and measured results when the lens meter is set for a measuring mode. In FIG. 1, a graph obtained in an additive diopter measuring mode, which will be described later, is displayed on the CRT display 1. The lens meter is provided with a print button 2, which is pushed to print out measured data, lens selector buttons 3, read button 4, which is pushed to read measured data, an additive diopter measuring mode selector button 5, a lens holder 6, a nose piece 7 for supporting a lens L, a positioning plate 8 for determining the longitudinal position of the lens L, and a guide pin 9 for determining the lateral position of the lens L. The lens L is positioned by the positioning plate 8 and the guide pin 9 for the measurement of additive diopter and pupil distance.

Refractive Power Measuring System

A refractive power measuring system included in the lens meter will be described hereinafter.

Figure 2:
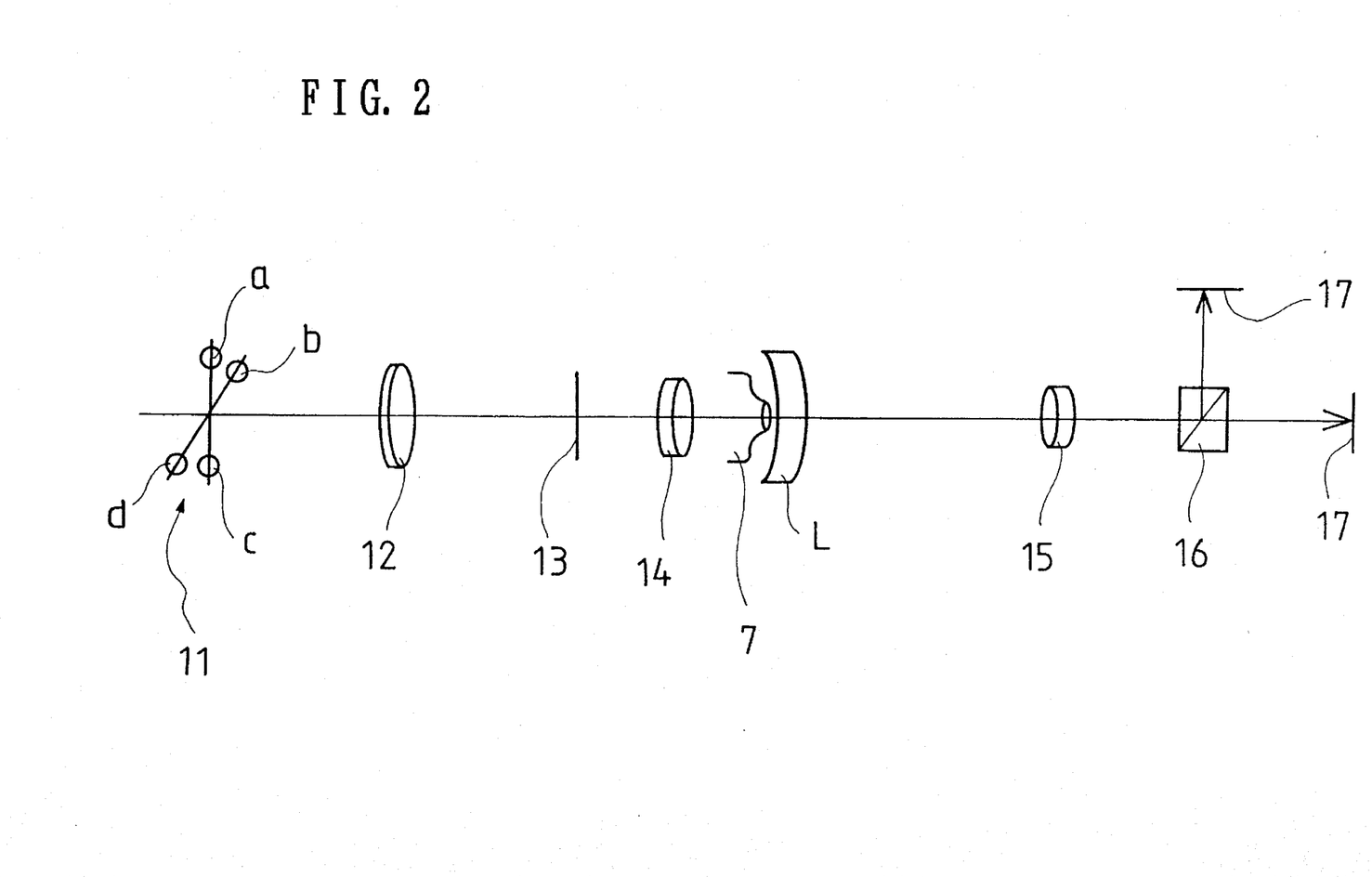
FIG. 2 is a diagrammatic view of a measuring optical system included in the lens meter of FIG. 1.
Figure 3:
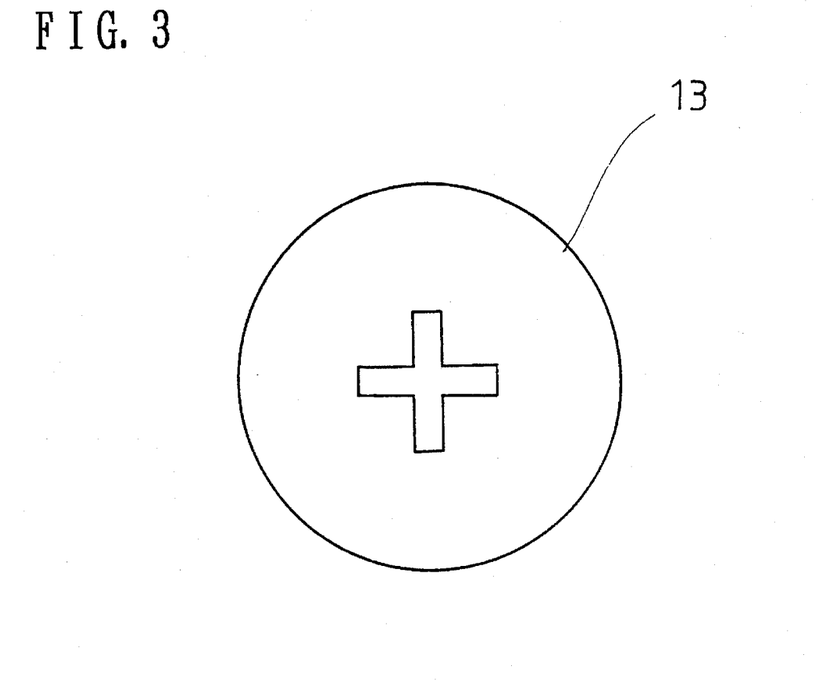
FIG. 3 is a front view of a target plate shown in FIG. 2, showing the shape of a slit formed in the target plate.

Referring to FIG. 2, four light emitting diodes (LEDs) 11 (11a, 11b, 11c and 11d) are disposed in a plane perpendicular to the optical axis of the refractive power measuring system and including the focal point of an objective lens 12. When the lens L is set on the nose piece 7, a microcomputer controls a LED driver to turn on the four LEDs 11a, 11b, 11c and 11d sequentially. A measuring target plate 13 is provided with a crossing slits and disposed fixedly or movably near the respective focal points of the objective lens 12 and a collimator lens 14. The nose piece 7 is disposed near the respective focal points of the collimator lens 14 and a focusing lens 15. Shown also in FIG. 2 are a half prism 16, and two linear image sensors 17 each comprising a plurality of photodiodes arranged in a linear array, and disposed perpendicularly to each other and to the optical axis.

Figure 4:
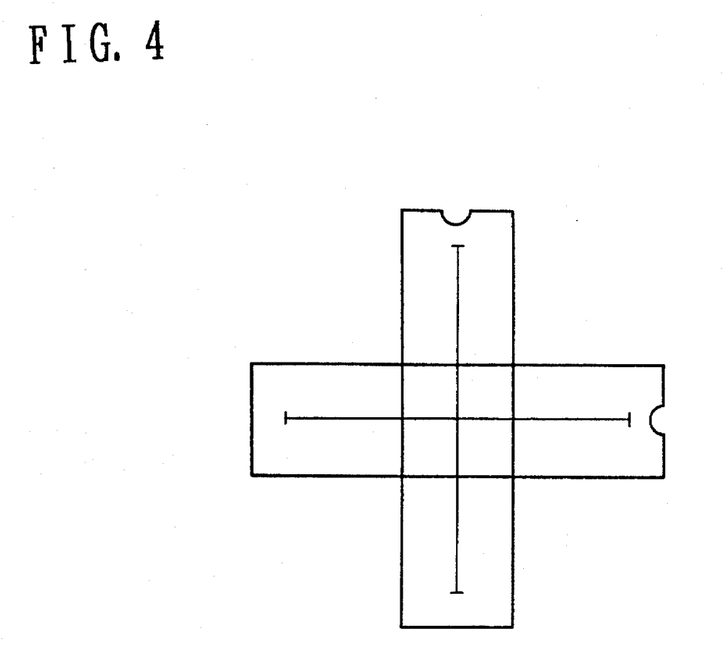
FIG. 4 is a view of a slit image formed on a photo-detecting device.

Light emitted by the LED 11 refracted by the objective lens 12, collimated by the collimator lens 14, refracted by the lens L and focused by the focusing lens 15 on the two image sensors 17. Thus, the image of the crossing slits of the target plate 13 as shown in FIG. 4 are formed on the image sensors 17.

A method of calculating the refractive power of the lens L on the basis of measured data obtained by measuring the lens L by the measuring optical system will be briefly described.

The four LEDs 11 are turned on individually to illuminate the target plate 13. If the lens L is not set on the nose piece 7, images of the crossing slits of the target plate 13 (hereinafter referred to as "target images") formed on the image sensors 17 by the light emitted by the LEDs 11a, 11b, 11c and 11d overlap each other.

If the lens L has only spherical refractive power, the target image is shifted on the imaging device by a distance corresponding to the spherical refractive power; the target image formed by the light emitted by the LED 11a or 11c is shifted along the line linking LED 11a to LED 11c, and the target image formed by the light emitted by the LED 11b or 11d is shifted along the line linking LED 11b to LED 11d.

If the lens L has only cylindrical refractive power, the lens L refracts the incident light in a direction perpendicular to the principal meridian (or parallel to the principal meridian). The cylindrical refractive power of the lens L can be calculated on the basis of the distance of shifting of the target image.

If the lens L has both spherical refractive power and cylindrical refractive power, the target image is shifted on the image sensors 17 by distances according to the spherical refractive power and cylindrical refractive power of the lens L.

Suppose that the respective coordinates of the respective centers of the target images formed respectively by the light emitted by the LEDs 11a, 11b, 11c and 11d are $A(x_a, y_a)$, $B(x_b, y_b)$, $C(x_c, y_c)$ and $D(x_d, y_d)$. Then, $$X_1 = |x_b - x_d| \quad (1)$$

$$X_2 = |x_a - x_c| \quad (2)$$

$$Y_1 = |y_a - y_c| \quad (3)$$

$$Y_2 = |y_b - y_d| \quad (4)$$

$$S = (X_2 + Y_2 \pm C)/2 \quad (5)$$

$$C = \sqrt{(X_2 - Y_2)^2 - 2(X_1^2 + Y_1^2)} \quad (6)$$

$$\theta = \tan^{-1}\sqrt{(X_2 - S)/(Y_2 - S)} \quad \text{or} \quad (7)$$
$$= \tan^{-1}\sqrt{(Y_2 - S)/(X_2 - S)}$$

$$PQ = \sqrt{\{(x_a + x_b + x_c + x_d)/4\}^2 + \{(y_a + y_b + y_c + y_d)/4\}^2} \quad (8)$$

where S is the spherical refractive power, C is the cylindrical refractive power, θ is the axial angle and PQ is the prism quantity.

A microcomputer 35 calculates the spherical refractive power, the cylindrical refractive power, the axial angle and the prism quantity of the lens L by using the coordinates of the target images formed by the light emitted by the LEDs 11a, 11b, 11c and 11d, and the expressions (1) to (8). The calculated data is displayed.

The four target images are blurred and dislocated by a distance proportional to the refractive power of the lens L, causing errors in the measurement. Accordingly, it is desirable to shift the target plate 13 to diminish the dislocation of the target images and to calculate the optical characteristics of the lens L on the basis of the distance of shifting of the target and the dislocation of the target images.

Position Detecting System

A position detecting system for positioning the lens L and detecting the position of the lens L will be described hereinafter.

Figure 5:
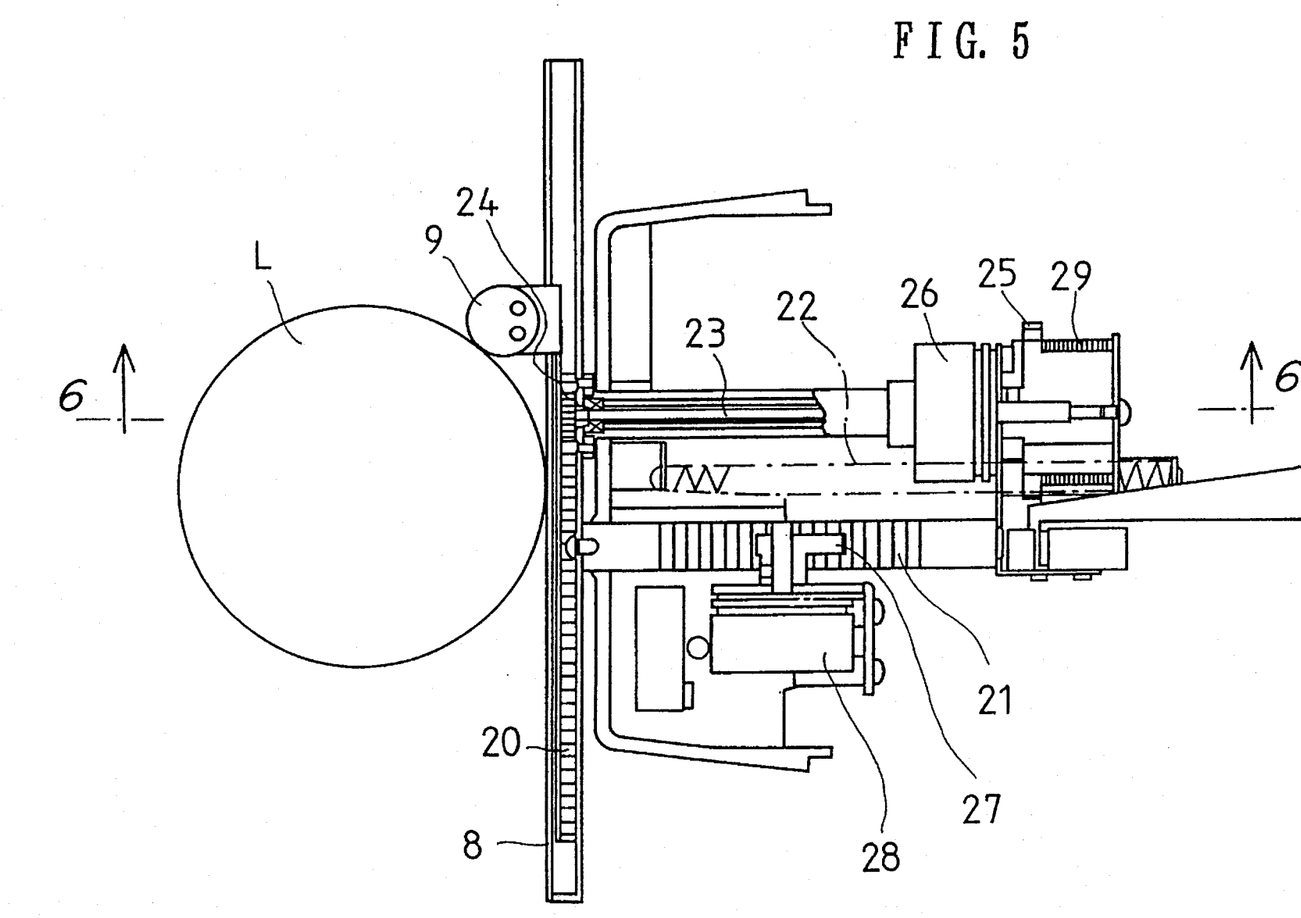
FIG. 5 is a plan view of a position detecting system included in the lens meter of FIG. 1.
Figure 6:
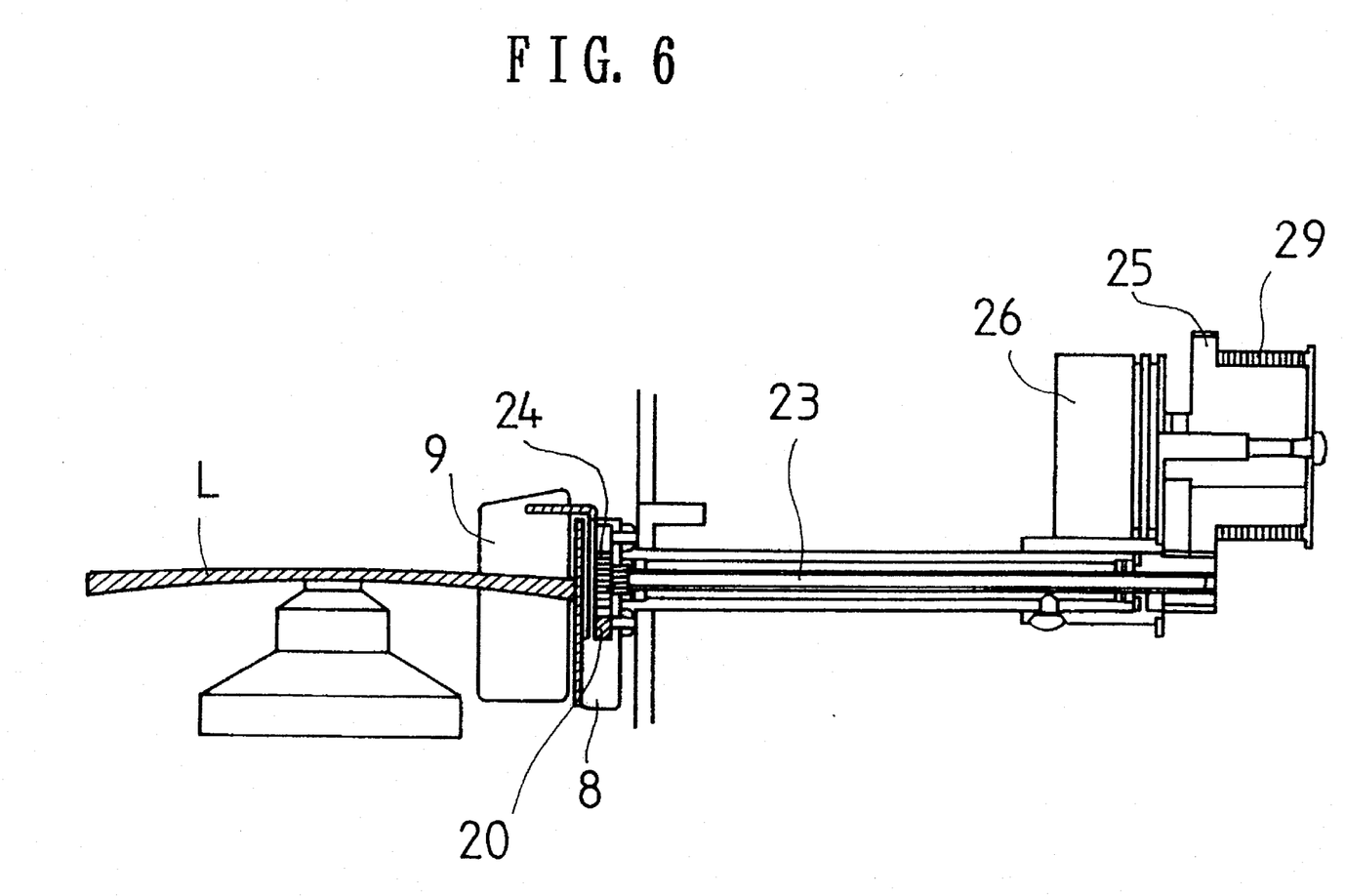
FIG. 6 is a sectional view taken on line 6—6 in FIG. 5.

Referring to FIGS. 5 and 6, a rack 20 is supported in a horizontal position within the positioning plate 8 for lateral movement and the guide pin 9 is fixed to the rack 20. The guide pin 9 is biased toward the left, as viewed in FIG. 5, by coil springs 29. The positioning plate 8 is fixed to a rack 21 supported for longitudinal movement and biased continuously toward the front by a spring 22. A pinion 24 fixedly mounted on one end of a rotating shaft 23 engages the rack 20 and is moved longitudinally together with the rack 20 by the rack 21. A gear 25 is mounted fixedly on the other end of the rotating shaft 23. The revolution of the gear 25 is detected by a potentiometer 26 to detect the distance of lateral movement of the guide pin 9. The revolution of a pinion 27 engaging the rack 21 is detected by a potentiometer 28 to detect the distance of longitudinal movement of the positioning plate 8. The lens L is held in contact with the positioning plate 8 and the guide pin 9, so that the distance of longitudinal movement and that of lateral movement of the lens L can be detected through the detection of the revolution of the gear 25 and that of the pinion 27.

Control Circuit

Figure 7:
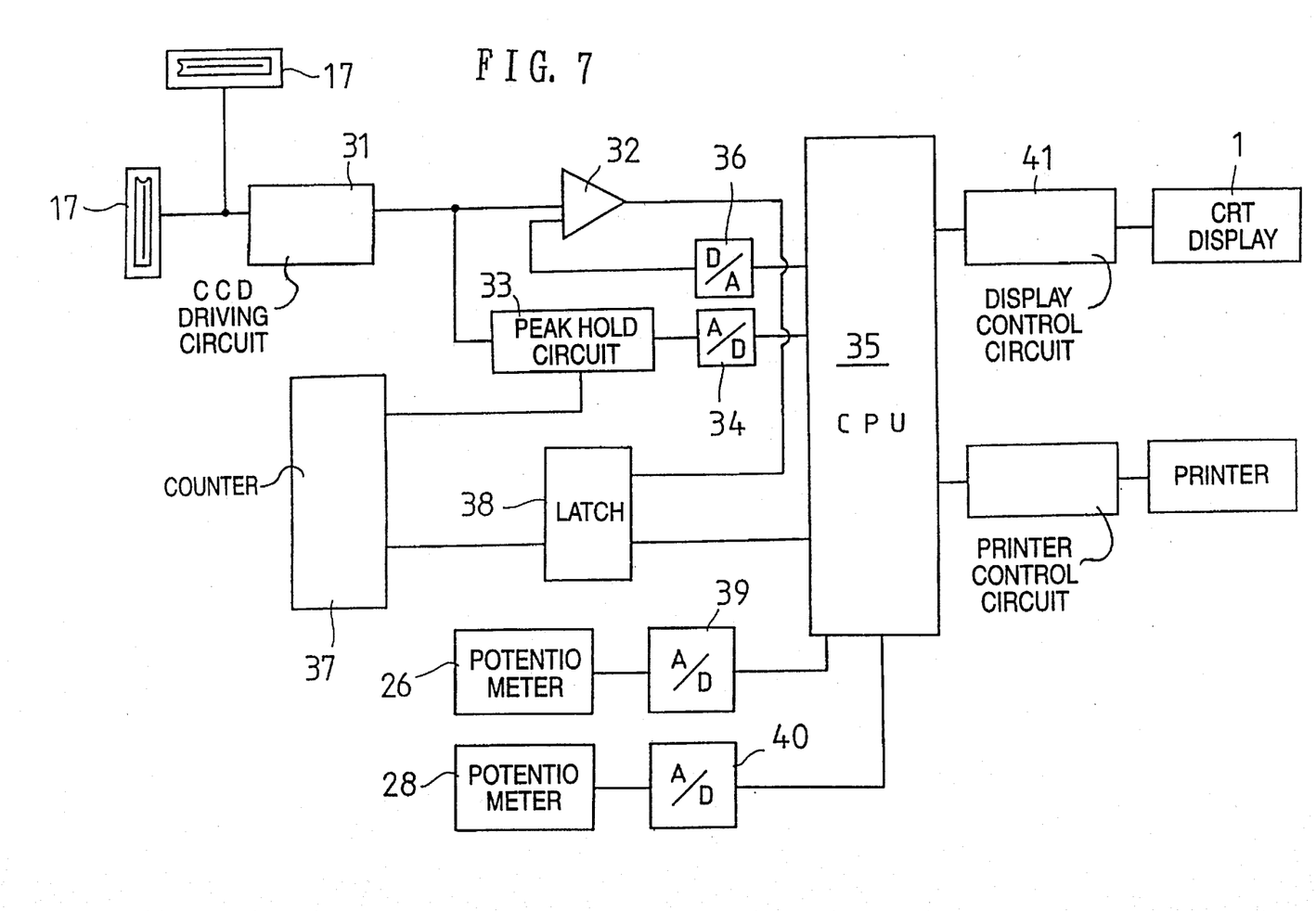
FIG. 7 is a block diagram of the lens meter of FIG. 1.

Referring to FIG. 7, signals provided by the two image sensors 17 are transferred through a CCD driving circuit 31 to a comparator 32 and a peak hold circuit 33. A peak voltage detected by the peak hold circuit 33 is converted into a corresponding digital peak signal by an A/D converter 34, and the digital peak signal is given to the microcomputer 35. The digital peak signal corresponding to the peak voltage detected by the peak hold circuit 33 is transferred through the microcomputer 35 to a D/A converter 36, the D/A converter 36 converts the digital peak signal into a half voltage signal corresponding to half the peak voltage, and then the half voltage signal is given to the comparator 32. The comparator 32 compares the half voltage signal with a signal given directly thereto by the CCD driving circuit 31 and provides a strobe signal. When the strobe signal is provided by the comparator 32, a signal provided by a counter 37 is given to a latch 38. The position of a shading edge is determined from the waveform, the microcomputer 35 determines the coordinates, and then the microcomputer 35 calculates the optical characteristics of the lens L on the basis of the coordinates.

The position data provided by the potentiometers 26 and 28 is transferred through the A/D converters 39 and 40 to the microcomputer 35. Then, the microcomputer 35 processes the position data, and then a display control circuit 41 controls the CRT display 1 to display the processed position data together with data stored in the memory in characters and graphs.

Operation

Operation of the lens meter in a measuring mode for measuring the optical characteristics of a single-focus lens will be described.

When measuring the spherical refractive power, astigmatic degree and astigmatic angle of a lens, a reticle is displayed on the CRT display 1. The LEDs 11 of the measuring optical system are turned on at predetermined intervals and the lens is mounted on the nose piece 7. Then, the refractive power on the measuring optical axis is calculated and displayed on the CRT display 1. The dislocation of the lens is calculated on the basis of the prism quantity and the target image is superposed on the reticle on the CRT display 1 at a position corresponding to the dislocation. Measured data obtained when the reticle and the target image meet a predetermined positional relation represents the optical characteristics of the lens.

The operation of the lens meter in a measuring mode for measuring the optical characteristics of framed progressive multifocus lenses will be described hereinafter.

Either the right lens selector button 3 or the left lens selector button 3 is depressed to specify a lens to be tested. A selected lens is put on the nose piece 7, and then the positioning plate 8 and the guide pin 9 are brought into contact with the lens. The reticle is displayed on the CRT display 1. The position of the lens is adjusted so that a section of the lens which is supposedly the far viewing section (a section specified by the lens maker) of the framed lens is positioned on the measuring optical axis. The additive diopter measuring mode selector button 5 is depressed to set the lens meter for operation in an additive diopter measuring mode, and then data representing the refractive power of the far viewing section of the lens is stored in the memory. A graph showing the relation between the spherical refractive power (equivalent spherical value SE is used for the sake of convenience) measured on the horizontal axis and the distance from a starting point from which the focal length starts varying progressively measured on the vertical axis is displayed on the CRT display 1.

Then, the position of the lens is adjusted so that the near viewing section is positioned on the measuring optical axis. Generally, the near viewing section is dislocated laterally relative to the far viewing section. In most lenses, the distance between the center of the far viewing section and that of the near viewing section is in the range of 2 to 2.5 mm. The distance detected by the potentiometer 26 is displayed on the CRT display 1. Since the optical strain (=|(measured cylindrical refractive power)−(cylindrical refractive power of the far viewing section)|) of the far viewing section—the progressive focus section—the near viewing section is zero, an optical strain calculated by the microcomputer 35, for example, "0.25" is displayed on the CRT display as a guide message. The lens is moved so that the optical strain is reduced to the least extent. From the view point of operating facility, a suitable allowable optical strain is on the order of 0.25. The longitudinal and lateral distances by which the lens is moved to position the lens at the measuring position are detected by the potentiometers 26 and 28. The longitudinal and lateral distances, the optical strain and the refractive power (or the difference between the measured spherical value and the spherical value of the far viewing section) are stored in the memory. Upon the completion of the measurement, the additive diopter measuring mode selector button 5 is depressed again.

Figure 8:
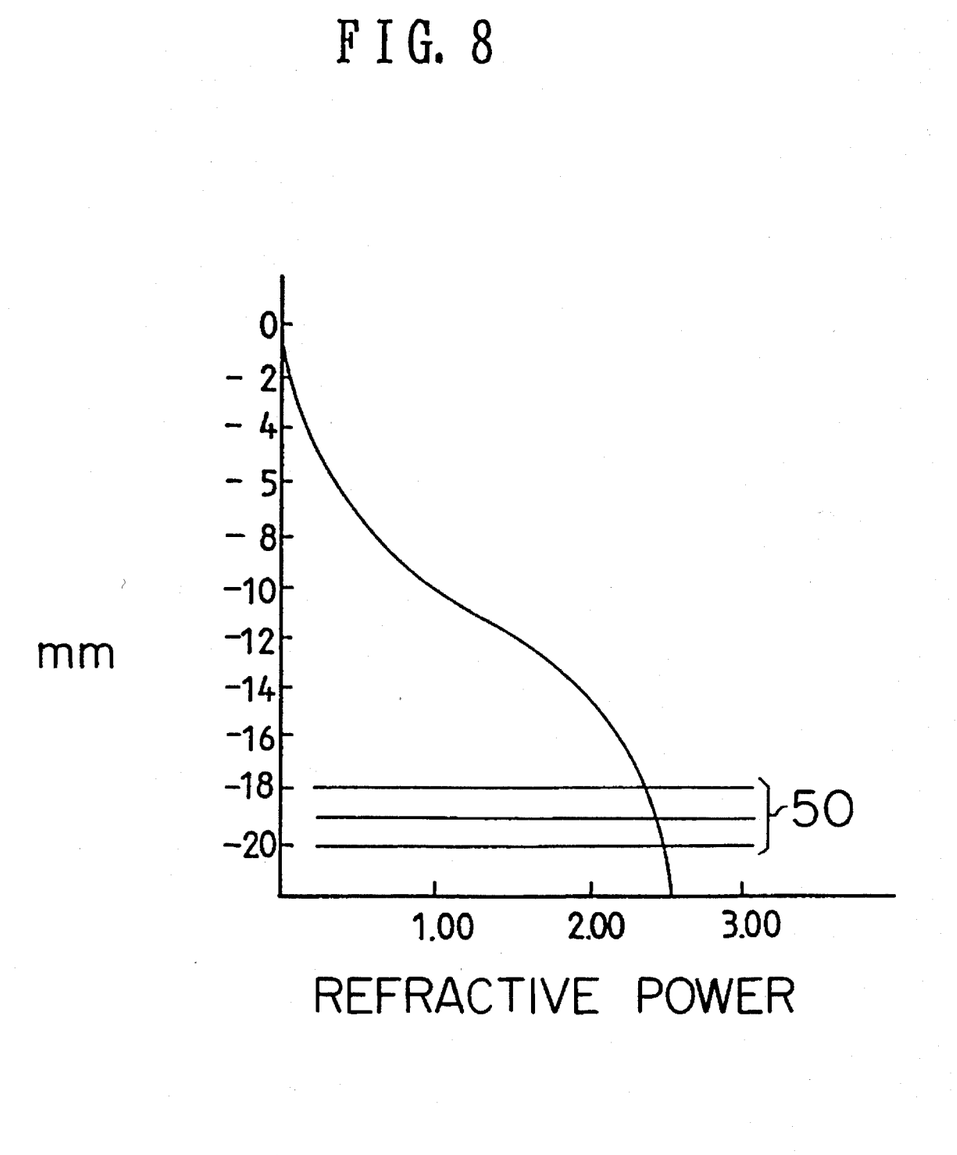
FIG. 8 is a diagram of a graph displayed on a display in an additive diopter measuring mode.

A graph as shown in FIG. 8 is completed by using the stored measured data and the graph is displayed on the CRT display 1. Data corresponding to the lateral dislocation, for example, 3 mm, and the optical strain, for example, 0.25 D, exceeding predetermined values may be omitted to enhance the reliability of the graph. The additive diopter may be read from the graph. The near viewing section 50 may be specified by operating a switch for scanning and a position may be specified by the distance from the far viewing section.

Figure 9:
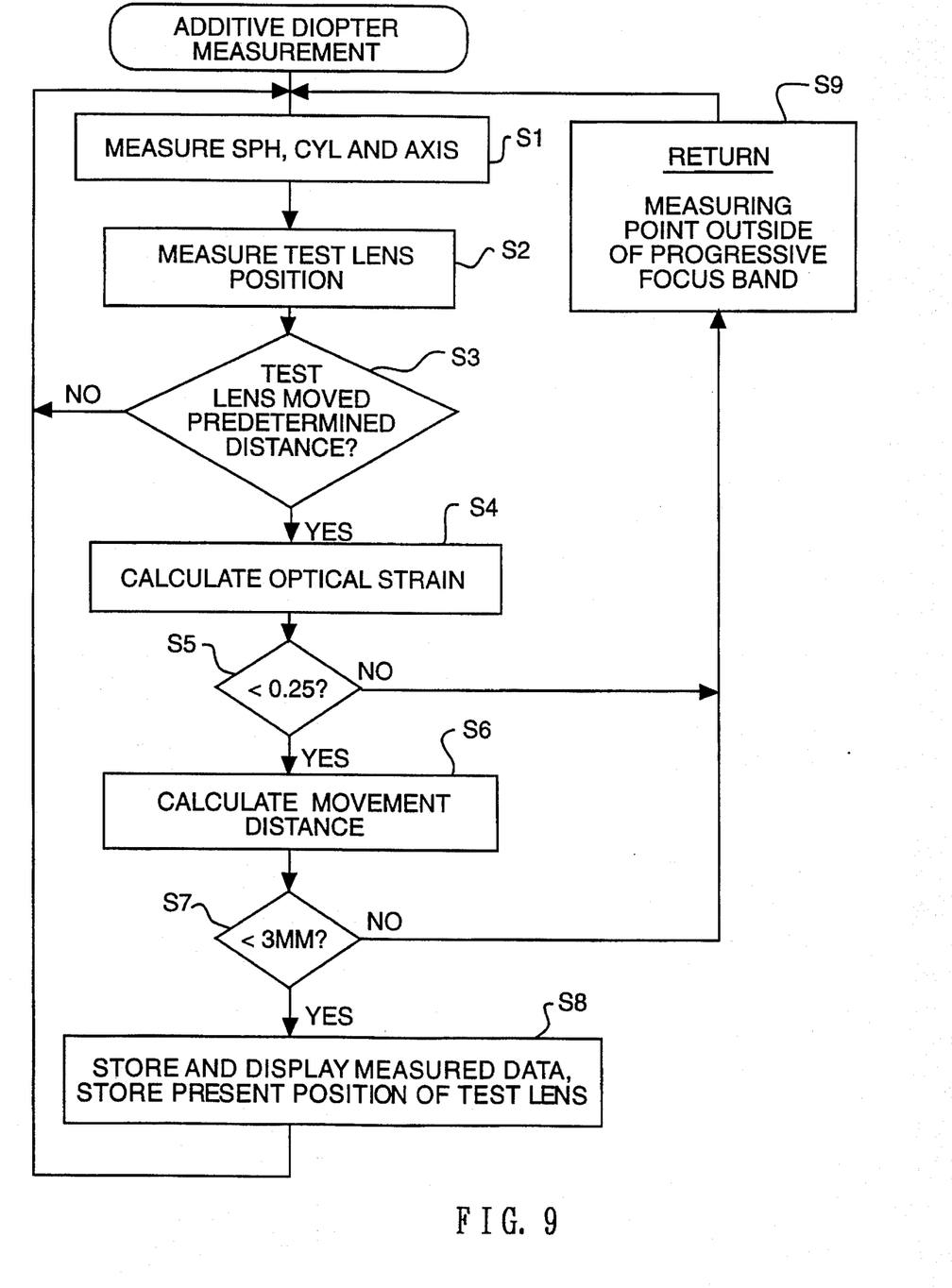
FIG. 9 is a flow chart explaining a series of steps of an additive diopter measuring procedure.

FIG. 9 is a flow chart showing a series of steps of an additive diopter measuring procedure. Referring to FIG. 9, the spherical refractive power SPH, cylindrical refractive power CYL and axial angle AXIS of the lens positioned at an initial position are measured in step S1. Then, the initial position is determined from signals provided by the potentiometers 26 and 28 in step S2. Then, query is made in step S3 to see if the lens mounted on the nose piece 7 has been moved longitudinally by a predetermined distance. If the response in step S3 is affirmative, optical strain (=|(measured cylindrical refractive power)−(cylindrical refractive power of the far viewing section)|) is calculated in step S4. Then, a query is made in step S5 to see if the calculated optical strain is less than 0.25 D. If the response in step S5 is affirmative, the distance of lateral movement (=|(position for measuring the far viewing section)−(initial position)|) is calculated in step S6. A query is made in step S7 to see if the calculated distance is less than 3 mm. If the response in step S7 is affirmative, step S8 is executed to store the measured data in the memory and to display the same on the CRT display 1, and to store the data of the initial position in the memory for reference in calculating the distance of longitudinal movement. Then, the routine returns to step S1. The additive diopter measuring procedure is executed every time the lens mounted on the nose piece 7 is shifted. Thus, a graph showing the relation between the distance of the progressive focus band from the starting point of the progressive focus section and the diopter of the progressive focus band is displayed on the CRT display 1 on the basis of the measured data. If the measuring point is positioned outside the progressive focus band, the response in step S5 is negative, namely, the measured optical strain is not less than 0.25 D. In such a case, information that the measuring point is positioned outside the progressive focus band is given to the operator, data obtained at the measuring point is omitted and the measuring position is not changed in step S9. Then the routine returns to step S1 to repeat the additive diopter measuring procedure. If the measuring point is positioned outside the progressive focus band, the response in step S7 also is negative, namely, the distance of lateral movement is not less than 3 mm. In this case also, step S9 is executed and the routine returns to step S1.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A lens meter for determining the optical characteristics of a progressive multifocus lens on the basis of the locus of measuring light projected on the progressive multifocus lens, transmitted through the progressive multifocus lens and detected by a photo-detecting device, said lens meter comprising:

an additive diopter measuring mode selector switch;

control means for measuring a refractive power at a plurality of measuring points of the progressive multifocus lens at predetermined intervals and for controlling the shifting of the progressive multifocus lens from a far viewing section of the progressive multifocus lens to a near viewing section of the progressive multifocus lens;

position detecting means for detecting a distance of movement of the progressive multifocus lens to each measuring point from a predetermined point in the far viewing section of the progressive multifocus lens; and display means for displaying the relation between the distance of each of the plurality of measuring points from the predetermined point in the far viewing section of the progressive multifocus lens and a variation of the spherical refractive power of the progressive multifocus lens from the predetermined point in the far viewing section of the progressive multifocus lens.

2. A lens meter according to claim 1, wherein said position detecting means comprises:

first detecting means for detecting a distance of vertical movement of the progressive multifocus lens as mounted; and second detecting means for detecting a distance of lateral movement of the progressive multifocus lens as mounted.

3. A lens meter according to claim 2, wherein the distance detected by said second detecting means is displayed by said display means during a measurement.

4. A lens meter according to claim 3, wherein the distance detected by the second detecting means exceeding a specified value is excluded from being displayed by the display means.

5. A lens meter according to claim 1, further comprising:

calculating means for calculating a difference between an astigmatic degree of each of the plurality of measuring points on the progressive multifocus lens and an astigmatic degree of the predetermined point of the far viewing section of the progressive multifocus lens, and the difference for each of the plurality of measuring points is displayed by the displaying means.

6. A lens meter according to claim 5, wherein the difference for each of the plurality of measuring points exceeding a specified value is excluded from being displayed by the display means.

7. A lens meter according to claim 1, wherein said display means is capable of graphic display.

8. A lens meter according to claim 7, wherein the display means displays tables or graphs.

9. A lens meter comprising:

a measuring optical system through which measuring light for measuring optical characteristics of a progressive multifocus lens travels;

lens holding means for holding the progressive multifocus lens on an optical path of the measuring optical system;

lens moving means for moving the progressive multifocus lens held by the lens holding means in a plane perpendicular to the optical path of the measuring optical system;

lens position detecting means for detecting a distance of movement of the progressive multifocus lens by said lens moving means to a measuring position;

arithmetic means for determining a refractive power of the progressive multifocus lens at the measuring position and for calculating a variation between the spherical refractive power of the progressive multifocus lens at the measuring position and the spherical refractive power at a previous measuring position; and display means for displaying the relation between the measuring position of the progressive multifocus lens and the variation of the spherical refractive power of the progressive multifocus lens at the measuring position.

10. A lens meter according to claim 9, wherein said measuring optical system includes:

a measuring light source that emits measuring light;

a measuring target plate through which the measuring light travels; and a photo-detecting device on which a target image of a target formed on the measuring target plate is focused.

11. A lens meter according to claim 10, wherein said measuring light source includes a plurality of light emitting diodes disposed in a plane perpendicular to the optical axis of said measuring optical system.

12. A lens meter according to claim 11, wherein said arithmetic means calculates the optical characteristics of the progressive multifocus lens on the basis of coordinates of each of respective centers of target images formed on said photo-detecting device by focusing measuring light emitted by each of the plurality of light emitting diodes after having traveled through said target plate.

13. A lens meter according to claim 9, wherein said lens position detecting means includes first detecting means for detecting a distance of movement of the progressive multifocus lens held by the lens holding means in one direction on the vertical plane of the optical path, and second detecting means for detecting a distance of movement of the progressive multifocus lens in another direction in the vertical plane of the optical path.

14. A lens meter according to claim 9, wherein said arithmetic means also calculates a difference between an astigmatic degree of the progressive multifocus lens at the measuring position and an astigmatic degree of the previous measuring position.

15. A lens meter according to claim 14, wherein said display means displays a graph showing a relation between a distance from a starting point from which the focal length of the progressive multifocus lens starts varying progressively and a variation of a refractive power of a progressive focus band.

16. A lens meter according to claim 9, further comprising an additive diopter measuring mode selecting means.

* * * * *